Dec. 13, 1938.  S. A. SNELL  2,139,863
MECHANISM CONTROL
Filed Jan. 27, 1936  3 Sheets-Sheet 1

Inventor
Samuel A. Snell
By Braselton, Whitcomb-Davies
Attorney

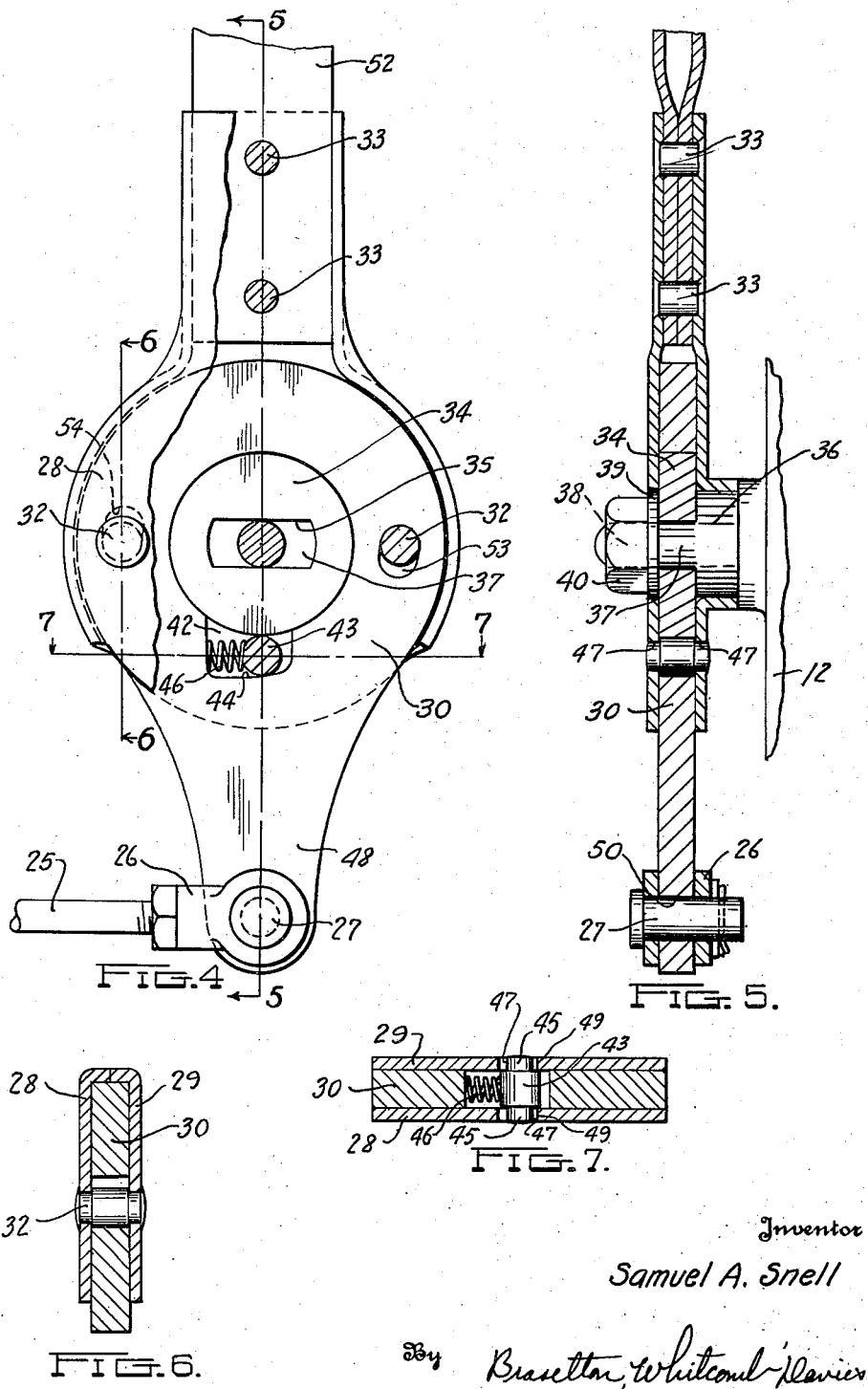

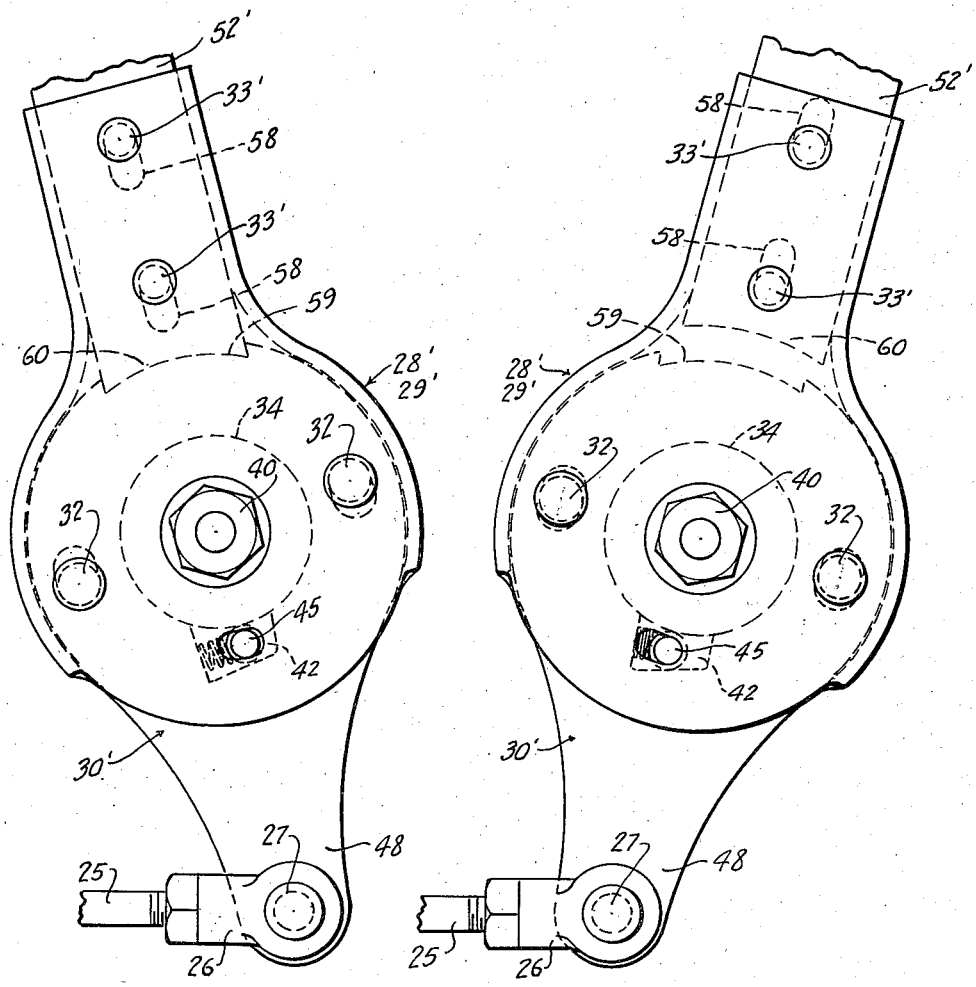

Patented Dec. 13, 1938

2,139,863

UNITED STATES PATENT OFFICE 2,139,863

MECHANISM CONTROL

Samuel A. Snell, Toledo, Ohio, assignor, by mesne assignments, to The Logan Gear Company, a corporation of Ohio Application January 27, 1936, Serial No. 60,912

17 Claims. (Cl. 74—531)

This invention relates to control mechanism and particularly to mechanism of the type used for controls of a motor vehicle or other apparatus.

The invention has for an object the provision of a control mechanism embodying clutching means wherein the lever element may be adjusted and retained in any desired position.

The invention embraces the provision of a control arrangement particularly adaptable for use in controlling the operation of braking mechanisms wherein the extent of movement of the control lever may vary in accordance with various factors, as for example, the amount of braking force or the position of adjustment of the brakes, the arrangement being provided with means adapted to retain the controlling lever in any position.

Another object is the provision of an arrangement wherein by the actuation of a manipulating means, the actuated element may be positively retained in any position of adjustment and yet may be readily and easily released.

A further object is the provision of a brake actuating mechanism or lever arrangement which embodies a one way clutch in conjunction with a limited relative movement connection so arranged that the actuated element may be moved to brake setting position and automatically retained in such position and yet the mechanism may be easily and quickly released.

Still another object is the provision of a lever mechanism control arrangement wherein the major parts may be formed from sheet material thus effecting substantial reduction in the expense of manufacture and assembly, and further enhances the uniformity and interchangeability of the parts.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 4 is a vertical sectional view through a portion of the lever arrangement of my invention;

Figure 5 is a vertical sectional view taken substantially on a line 5—5 of Figure 4;

Figure 6 is a vertical sectional view taken substantially on the line 6—6 of Figure 4;

Figure 7 is a vertical sectional view taken substantially on line 7—7 of Figure 4.

Figure 8 is a view similar to Figure 3 showing a form of the invention having a relatively movable handle portion for locking purposes;

Figure 9 is a view similar to Figure 8 showing the relatively movable handle portion in an ineffective operating position.

I have illustrated the features of my invention as applicable to a brake actuating mechanism for automotive vehicles, but it is to be understood that I contemplate the use of my invention in any mechanism where the same may be found to have utility therein.

Figure 1:
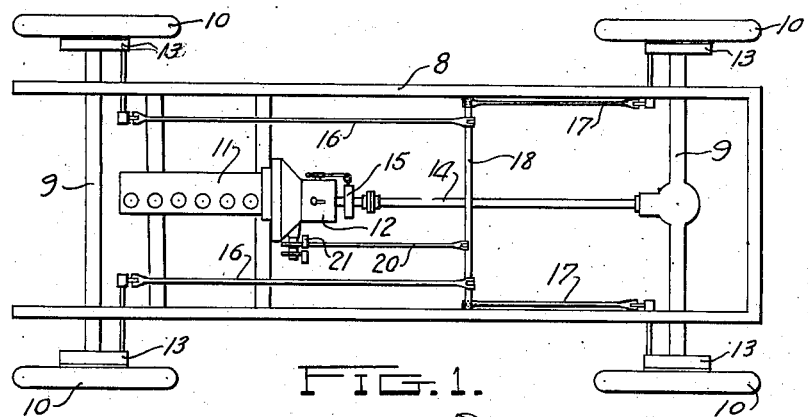
Figure 1 is a top plan view of a vehicle chassis showing one form of my invention embodied therein.
Figure 2:
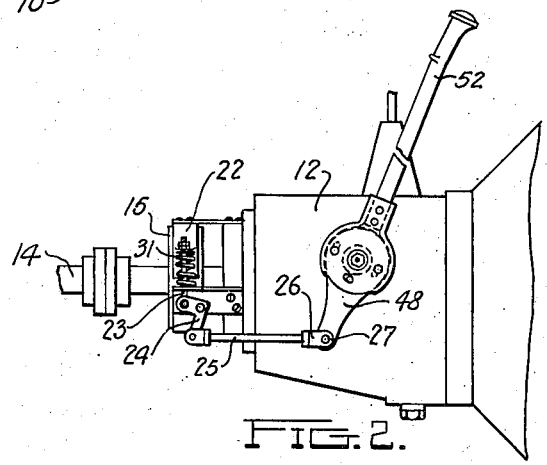
Figure 2 is an enlarged fragmentary elevational view of a portion of the mechanism of a vehicle showing one form of installation of the lever mechanism of my invention.
Figure 3:
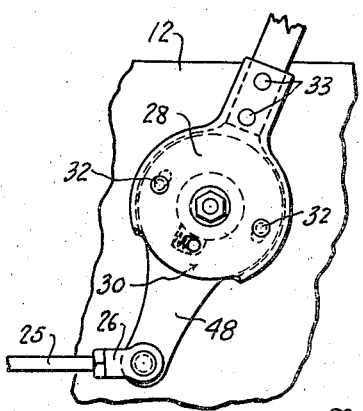
Figure 3 is an enlarged elevational view of a portion of the lever arrangement of my invention.

Referring to the drawings in detail, particularly Figure 1, I have illustrated a chassis of an automotive vehicle comprising essentially a frame 8, axles 9, wheels 10, a power unit or engine 11 arranged and supported in the conventional manner. Positioned immediately at the rear of the engine 11 is a transmission mechanism or gear set 12, a drive shaft 14 to the rear wheels, the shaft 14 carrying a brake drum 15. In the embodiment illustrated the braking mechanism cooperating with the drum 15 is of the so-called emergency type and with which for practical illustration I have incorporated my invention. Associated with the wheels 10 are individual service brakes 13 which are connected by means of rods 16 and 17 to a transverse operating shaft 18 which is in turn connected by link 20 to a service brake pedal 21 or other suitable operating means. If desired, the control mechanism of my invention may be associated with the latter described braking system without departing from the spirit of the invention.

One form of the control mechanism of my invention is particularly illustrated in Figures 2 through 7 inclusive, being connected to a brake band 22 through the medium of a "pull" or extension rod 23, a bell crank lever 24, link 25, clevis 26, to a pin 27 carried by the brake actuating or control mechanism. The lever or control mechanism of my invention comprises a pair of similarly shaped plates or housing sections 28 and 29 preferably fabricated of sheet metal which are formed with a substantially circular portion which receives or partially houses a lever element or member 30, the housing sections being held together by means of rivets or pins 32 and 33 or other suitable means. The lever element 30 is provided with a circular opening which receives a supporting collar or bushing 34 preferably having a non-circular opening 35 therein, which bushing in the present embodiment forms a part of the stationary supporting structure for the lever mechanism as well as one of the elements cooperating with the clutch means hereinafter described. A cylindrical projection or stud 36 which may be an integral part of the transmission housing wall 12 or may be otherwise secured to some convenient portion of the vehicle is provided with a tenon portion 37 corresponding to the shape of the opening 35 and snugly projects into the opening 35. The stud 36 is provided with a threaded portion 38 which accommodates a washer 39 and a nut 40 for holding the bushing 34 and associated mechanism on the stud. In the present embodiment the bushing 34 is made separable from member 36 to facilitate assembly of the mechanism, but it is to be understood that the bushing may be formed as an integral part of the member 36 without departing from the spirit and scope of the invention. The member or element 30 is fitted on the bushing 34 so as to be relatively rotatable for purposes to be hereinafter explained. The member 30 is provided with a recess 42 within which is positioned a roller or clutch element 43 adapted for wedging or clutching engagement with a wall 44 of the recess and the periphery of the bushing 34 when the sections 28 and 29 are rotated in one direction with respect to the relatively fixed supporting bushing 34. I have provided an expansible spring 46 which continuously urges the clutch or roller 43 toward clutching position, i. e., into contact with the wall 44 and the periphery of bushing 34.

The sections 28 and 29 are provided with aligned openings or slots 47 to receive or accommodate the reduced extremities 45 of the clutch roller or member 43. The relative movement of the sections 28 and 29 with respect to the lever element 30 effects the release of the clutch roller 43 in a manner to be hereinafter more fully described. The lever element or member 30 forming a component part of the control mechanism is provided with a depending portion 48, the latter having an opening 50 adapted to receive a pin 27 for connection to a clevis 26.

The operating means for moving the sections 28 and 29 of the mechanism includes in the embodiment illustrated a handle or manipulating member 52 which is secured by rivets 33 or other suitable means between upwardly extending portions of sections 28 and 29. The member 30 is provided with elongated slots 53 and 54, through which the rivets or pins 32 project, which provide the means for effecting a release of the clutch roller.

To initiate the operation of the brake operating mechanism, the manipulating or lever handle 52 is moved in a counter-clockwise direction (as viewed in Figure 2) about the axis of the supporting structure including bushing 34 carrying the housing sections 28 and 29 and lever element 30 and associated mechanism through engagement of the rivets 32 with end walls of the slots 53 and 54 causing a movement of brake rod 25, oscillation of bell crank lever 24, drawing the brake band 22 into frictional engagement with the brake drum 15 to set the brake.

When the mechanism has been moved in a counterclockwise direction to brake setting position, the cylindrical roller or clutch member 43 is wedged or clutched under the influence of spring 46 into close frictional engagement between the periphery of the bushing 34 and the wall 44 of the member 30 providing such frictional component as will prevent the return of the member 30 and mechanism carried thereby to brake releasing position and thus automatically retain the brake in "set" position against the tension of the brake releasing spring 31.

When it is desired to release the brake mechanism, the handle member 52 is moved clockwise and due to the space or lost motion between the rivets 32 and the end walls of the slots 53 and 54, the handle member 52 and the housing sections 28 and 29 will move in a clockwise direction slightly without moving the member 30. As the trunnions 45 of the clutch roller 43 are carried in slots 47 in the housing sections 28 and 29, a clockwise movement of the handle member 52 causes the end walls 49 of slots 47 to contact with the trunnions 45 and thus move clutch roller 43 out of wedging engagement with the periphery of the bushing 34 and the wall 44, thus releasing the member 30 and permitting the same to return to released position under the influence of the brake releasing spring 31. From the foregoing explanation, it can be seen that a counterclockwise movement of the handle 52 to any position will effect a locking engagement of the clutch 43 retaining the brake in "set" position and a release of the mechanism can only be effected by proper clockwise movement of the operating handle or lever 52.

In the arrangement of my invention illustrated in Figures 8 and 9 I have illustrated a fool proof locking means so that the brake cannot be released by inadvertent or accidental clockwise movement of the handle member. In one form, as illustrated, this result may be accomplished by making one of the component parts of the manipulating arrangement relatively movable with respect to another portion of the lever.

Thus, the housing sections 28' and 29' are held together by means of rivets 33' which correspond to the rivets 33 in the form of the invention hereinbefore described. In the embodiment shown in Figures 8 and 9, the manipulating or handle member 52' is provided with slots 58 through which extend the rivets 33', the handle member being capable of longitudinal sliding movement with respect to the lever element 30'. The element 30' is formed with recess 59 which is spaced to slidably receive extremity 60 of the handle 52'. The construction is otherwise the same as the lever arrangement hereinbefore described and illustrated in Figures 1 through 7 inclusive.

Figure 8 illustrates the arrangement of parts with the lever mechanism in "brake setting position". In this position the handle member 52' is in its innermost position with respect to the axis of the lever support with the extremity 60 snugly fitting in the notch 59 in lever element 30'. With the handle member in this position in engagement with member 30' substantially no lost motion or relative movement can take place between the housing sections 28' and 29' and the lever element 30'. To release the brake, in this form of the invention, it is only necessary to slide the handle 52' outwardly away from the axis of the lever support to disengage extremity 60 of the handle from the recess 59 in member 30' as illustrated in Figure 9 and rotate the handle 52' in a clockwise direction. This rotative movement with the handle member in its outermost or extended position permits slight relative movement between the housing sections 28', 29' and the member 30' so as to effect a release of the clutch roller through the trunnion 45 in the manner hereinbefore explained in connection with the form of the invention illustrated in Figures 1 through 7. Figure 9 illustrates the position of the handle member 52' and the relation of the other parts in a position in which the brakes are released.

It is apparent that within the scope of the invention, modifications and different arrangements may be made other than is herein disclosed, and the present disclosure is illustrative merely, the invention comprehending all variations thereof.

What I claim is:

1. In combination, a lever mechanism comprising a support; a member mounted upon said support and capable of movement relative thereto; a housing comprising substantially matched sections formed of sheet material straddling said member; a clutch interposed between said support and said member, said clutch having connection with said sections; a lost motion connection between the housing and the member; and means for effecting relative movement between said housing and said member for releasing the clutch.

2. In combination, a lever mechanism comprising a support having a cylindrical portion; a member journalled upon said cylindrical portion and capable of rotative movement with respect thereto; a sheet metal plate positioned adjacent said member and having a lost motion connection therewith; a one way clutch having a clutch element carried by said plate for frictional engagement with said member and said support to retain the lever mechanism in adjusted position; and means for causing relative movement between said plate and said member to effect a release of said clutch.

3. In combination, a lever mechanism comprising a support; a member mounted upon said support and capable of movement relative thereto; a housing comprising substantially matched sections formed of sheet metal straddling said member; a clutch interposed between said support and said member, said clutch having connection with said sections; and a lost motion connection between the housing and the member.

4. In combination, a lever mechanism comprising a support having a cylindrical portion; a member mounted upon said cylindrical portion and capable of rotative movement with respect thereto; a sheet metal plate positioned adjacent said member and having a lost motion connection therewith; a one way clutch cooperating with said member and said support to retain the lever mechanism in adjusted position; means to effect a release of said clutch by causing relative movement between said plate and said member; and means for rendering said releasing means ineffective.

5. In combination, a lever mechanism comprising a cylindrical support; a member journalled upon said cylindrical support; a plate arranged adjacent said member for moving the latter with respect to said support; clutch means carried by said plate for engaging said support and said member to retain the lever mechanism in adjusted position; and a lost motion connection between the plate and the member for effecting a release of said clutch.

6. In combination, a lever mechanism comprising a cylindrical support; a member journalled upon said cylindrical support; a sheet metal plate arranged adjacent said member; a connection between said plate and said member whereby the plate moves with the member and limited movement may be had between said member and plate; clutch means cooperating with said support and said member and rendered effective by the movement of said plate in one direction to retain the lever mechanism in adjusted position; and means for effecting relative movement between said plate and said member for releasing said clutch.

7. In combination, a lever mechanism comprising a support having a cylindrical portion; a member mounted upon said cylindrical portion and capable of rotative movement with respect thereto; a plate positioned adjacent said member; a connection between said plate and member providing limited relative movement of the plate with respect to said member; a one way clutch cooperating with said member and said support to retain the lever mechanism in adjusted position; and means including a handle member for causing relative movement between said plate and said member to effect a release of said clutch, said handle serving as a means to lock said plate to said member.

8. In combination, a lever mechanism comprising a support; a member mounted upon said support and capable of movement relative thereto; a housing comprising substantially matched sections formed of sheet metal straddling said member; a one way clutch interposed between said support and said member, said clutch having connection with said sections; a connection between the housing and the member providing limited relative movement of the housing with respect to said member; and means for effecting relative movement between said housing and said member for releasing the clutch.

9. In a lever mechanism the combination of a support; a member mounted on said support; a housing for said member; a lost motion pin and slot connection between said housing and said member; and means interposed between said support and said member including a friction roller supported by said housing for retaining the member in adjusted position.

10. In a control mechanism the combination of a member; a housing for said member; a pin and slot connection between said housing and said member; means including a clutch member having a portion extending into an opening in said housing wall for normally preventing movement of said mechanism in one direction.

11. In a control mechanism the combination of a support; a lever element having a substantially circular portion; a housing formed of sheet metal substantially enclosing said circular portion; a handle portion cooperating with said lever element; a lost motion connection between said lever element and said housing; and means for retaining said control mechanism in adjusted position including a one way clutch interposed between said support and said lever element having a friction element carried by said housing.

12. In a control mechanism the combination of a support; a lever element; a manipulating handle; a housing enclosing a portion of said lever element, said lever being mounted for limited movement with respect to said housing; means including a one way clutch for retaining said lever element in adjusted position; means whereby lateral movement of said manipulating handle effects relative movement between said element and said housing to release the clutch and longitudinal movement of said handle locks said housing to said lever element.

13. In combination, a lever mechanism comprising a support; a member mounted upon said support; means enclosing a portion of said member comprising two substantially matched half sections of sheet material; means for securing said sections together; cooperative stop means arranged between said sections and said member permitting limited relative movement therebetween; and clutch means interposed between said member and said support for retaining the lever mechanism in adjusted position.

14. In combination, a lever mechanism comprising a support; a member mounted upon said support; means enclosing a portion of said member comprising two substantially matched half sections of sheet material; means for securing said sections together; means including a pin and slot connection arranged between said sections and said member permitting limited relative movement therebetween; clutch means interposed between said member and said support for retaining the lever mechanism in adjusted position; and a handle portion cooperating with said member for actuating the mechanism.

15. In combination, a lever mechanism comprising a support; a member mounted upon said support; means enclosing a portion of said member comprising two substantially matched half sections of sheet material; means for securing said sections together; cooperative stop means including pin and slot connection arranged between said sections and said member permitting limited relative movement therebetween; clutch means interposed between said member and said support for retaining the lever mechanism in adjusted position; a handle portion movably connected to said sections, said handle portion adapted for cooperative engagement with said member whereby said lever mechanism may be effectively locked in adjusted position.

16. In combination, a cylindrical supporting member; a lever element journalled upon said supporting member; a clutch element interposed between the surface of said cylindrical supporting member and a portion of the lever element; a plate arranged adjacent said lever element; cooperative stop means arranged between said lever element and said plate affording limited movement therebetween; a handle member cooperatively associated with said plate and capable of relative movement with respect thereto, said handle portion being arranged whereby movement thereof independent of said lever element effectively locks said member against movement in one direction.

17. In combination, a lever mechanism comprising a support; a lever element mounted upon said support; means enclosing a portion of said lever element comprising two substantially matched half sections of sheet material; means for securing said sections together; cooperative stop means including pin and slot connection arranged between said sections and said lever element permitting limited relative movement therebetween; a clutch means interposed between said lever element and said support for normally retaining the lever in adjusted position; resilient means normally urging said clutching means toward clutching position; said matched sections having registering slots; said clutch having portions projecting into said slots, the walls of said slots being arranged to contact with said clutch means whereby movement of said sections in one direction effects a disengagement of the clutch means with said support and said lever element.

SAMUEL A. SNELL.